US006632030B2

United States Patent
Jiang et al.

(10) Patent No.: US 6,632,030 B2
(45) Date of Patent: Oct. 14, 2003

(54) LIGHT BENDING OPTICAL BLOCK FOR FIBER OPTIC MODULES

(75) Inventors: Wenbin Jiang, Thousand Oaks, CA (US); Edwin D. Dair, Los Angeles, CA (US); Cheng Ping Wei, Gilbert, AZ (US)

(73) Assignee: E20 Communications, Inc., Calabasas, CA (US)

( * ) Notice: Subject to any disclaimer, the term of this patent is extended or adjusted under 35 U.S.C. 154(b) by 80 days.

(21) Appl. No.: 09/860,930

(22) Filed: May 17, 2001

(65) Prior Publication Data

US 2003/0031430 A1 Feb. 13, 2003

Related U.S. Application Data

(63) Continuation-in-part of application No. 09/321,308, filed on May 27, 1999.
(60) Provisional application No. 60/253,606, filed on Nov. 27, 2000, and provisional application No. 60/283,046, filed on Apr. 10, 2001.

(51) Int. Cl.[7] .................................................. G02B 6/36
(52) U.S. Cl. ............................. 385/93; 385/92; 385/88; 385/89; 385/14
(58) Field of Search .............................. 385/88, 89, 92, 385/93, 94, 38, 31, 33, 34, 36, 14

(56) References Cited

U.S. PATENT DOCUMENTS

| 3,792,284 A | 2/1974 | Kaelin ..................... 385/101 X |
| 3,809,908 A | 5/1974 | Clanton ................... 385/101 X |
| 3,870,396 A | 3/1975 | Racki et al. ............... 385/39 X |
| 3,976,877 A | 8/1976 | Thillays .............. 250/227.11 X |
| 4,149,072 A | 4/1979 | Smith et al. ............ 385/114 X |

(List continued on next page.)

FOREIGN PATENT DOCUMENTS

| EP | 0 652 696 A1 | 11/1994 | ................ 385/92 X |
| JP | 408321627 A | 12/1996 | ................ 385/14 X |

OTHER PUBLICATIONS

Buczynski et al., Fast Optical Thresholding with an Array of Optoelectronic Transceiver Elements, IEEE Photonics Technology Letter, vol. 11, No. 3, Mar. 1999.
Heinrich et al., Low–cost VCSEL—Transceiver Module for Optical Data Busses, IEEE, 1997.
Rosinski et al., Multichannel Transmission of a Multicore Fiber Coupled with Vertical–Cavity Surface–Emitting Lasers, Journal of Lightwave Tech., vol. 17, No. 5, May 1999.
Crow et al., The Jitney Parallel Optical Interconnect, 1996 Electronic Components and Technology Conference.
Chen et al., Optoelectronic Interconnects and Packaging, Critical Reviews of Optical Science and Technology, vol. CR62, 1966, pp. 48–63, 64–67, 229–243, 393–404, 405–414, 442–460, Spie Optical Engineering Press.

(List continued on next page.)

*Primary Examiner*—Brian Healy
(74) *Attorney, Agent, or Firm*—Blakely Sokoloff Taylor & Zafman

(57) ABSTRACT

A method, apparatus, and system to couple photons between optoelectronic devices and small form factor fiber connectors. An optical block includes refraction surfaces to narrow the distance between two or more light transmission paths through the optical block thereby enabling a module to be coupled to closely spaced fiber optic connectors. In one embodiment, light from a first light path through the optical block is refracted in the direction of a second light path through the optical block. Prior to intersecting the second light path, the light from the first light path is refracted again to provide the first light path closer to, but independent of, the second light path.

72 Claims, 9 Drawing Sheets

U.S. PATENT DOCUMENTS

| | | |
|---|---|---|
| 4,161,650 A | 7/1979 | Caouette et al. ............ 385/53 X |
| 4,229,067 A | 10/1980 | Love .......................... 385/34 X |
| 4,273,413 A | 6/1981 | Bendikens et al. ......... 385/92 X |
| 4,347,655 A | 9/1982 | Zory et al. ...................... 29/389 |
| 4,422,715 A | 12/1983 | Williams et al. ........... 385/53 X |
| 4,423,922 A | 1/1984 | Porter ....................... 385/39 X |
| 4,432,604 A | 2/1984 | Schwab ..................... 385/53 X |
| 4,446,515 A | 5/1984 | Sauer et al. .............. 364/200 X |
| 4,449,244 A | 5/1984 | Kopainsky ............... 359/115 X |
| 4,461,537 A | 7/1984 | Raymer, II et al. ........ 385/88 X |
| 4,493,113 A | 1/1985 | Forrest et al. ............. 385/88 X |
| 4,533,209 A | 8/1985 | Segerson et al. .......... 385/92 X |
| 4,534,616 A | 8/1985 | Bowen et al. ............. 385/53 X |
| 4,535,233 A | 8/1985 | Abraham .................... 330/308 |
| 4,539,476 A | 9/1985 | Donuma et al. .... 250/227.11 X |
| 4,542,076 A | 9/1985 | Bednarz et al. .............. 428/624 |
| 4,549,782 A | 10/1985 | Miller ...................... 385/88 X |
| 4,549,783 A | 10/1985 | Schmachtenberg, III .. 385/53 X |
| 4,553,811 A | 11/1985 | Becker, deceased et al. .......... 385/88 X |
| 4,580,295 A | 4/1986 | Richman .................. 385/24 X |
| 4,595,839 A | 6/1986 | Braun et al. ......... 250/227.11 X |
| 4,611,884 A | 9/1986 | Roberts ..................... 385/88 X |
| 4,612,670 A | 9/1986 | Henderson .................. 250/551 |
| 4,625,333 A | 11/1986 | Takezawa et al. ......... 385/53 X |
| 4,647,148 A | 3/1987 | Katagiri ............. 250/227.11 X |
| 4,678,264 A | 7/1987 | Bowen et al. ............. 385/92 X |
| 4,701,010 A * | 10/1987 | Roberts ....................... 385/31 |
| 4,720,630 A | 1/1988 | Takeuchi et al. .... 250/227.11 X |
| 4,727,248 A | 2/1988 | Meur et al. ......... 250/227.11 X |
| 4,807,955 A | 2/1989 | Ashman et al. ..... 385/227.11 X |
| 4,840,451 A | 6/1989 | Sampson et al. ......... 385/53 X |
| 4,844,581 A | 7/1989 | Turner ...................... 385/92 X |
| 4,881,789 A | 11/1989 | Levinson .................. 385/14 X |
| 4,897,711 A | 1/1990 | Blonder et al. ........... 385/92 X |
| 4,913,511 A | 4/1990 | Tabalba et al. ............ 385/92 X |
| 4,945,229 A | 7/1990 | Daly et al. ............. 250/227.11 |
| 4,979,787 A | 12/1990 | Lichtenberger ........... 385/92 X |
| 4,986,625 A | 1/1991 | Yamada et al. ........... 385/53 X |
| 4,989,934 A | 2/1991 | Zavracky et al. ......... 383/14 X |
| 5,005,939 A | 4/1991 | Arvanitakis et al. ...... 385/53 X |
| 5,011,246 A | 4/1991 | Corradetti et al. ........ 385/53 X |
| 5,039,194 A | 8/1991 | Block et al. ................... 385/88 |
| 5,043,775 A | 8/1991 | Lee ........................... 372/38 X |
| 5,093,879 A | 3/1992 | Bregman et al. ............. 385/93 |
| 5,099,307 A | 3/1992 | Go et al. ................... 385/92 X |
| 5,104,243 A | 4/1992 | Harding ........................ 385/84 |
| 5,109,453 A | 4/1992 | Edwards et al. .............. 385/90 |
| 5,117,476 A | 5/1992 | Yingst et al. .................. 385/88 |
| 5,122,893 A | 6/1992 | Tolbert ..................... 385/92 X |
| 5,136,152 A | 8/1992 | Lee ........................... 385/92 X |
| 5,155,786 A | 10/1992 | Ecker et al. ................... 385/94 |
| 5,159,190 A | 10/1992 | Hohberg et al. .......... 385/16 X |
| 5,168,537 A | 12/1992 | Rajasekharan et al. ....... 385/89 |
| 5,202,943 A | 4/1993 | Carden et al. ............... 385/92 |
| 5,225,942 A * | 7/1993 | Ikeno et al. .................. 359/154 |
| 5,241,614 A | 8/1993 | Ecker et al. ................... 385/94 |
| 5,259,054 A | 11/1993 | Benzoni et al. ............... 385/89 |
| 5,274,723 A * | 12/1993 | Komatsu ..................... 385/92 |
| 5,280,191 A | 1/1994 | Chang ........................ 257/702 |
| 5,285,512 A | 2/1994 | Duncan et al. ............... 385/94 |
| 5,289,345 A | 2/1994 | Corradetti et al. .......... 361/752 |
| 5,295,214 A | 3/1994 | Card et al. ................... 385/92 |
| 5,337,396 A | 8/1994 | Chen et al. .................. 385/92 |
| 5,337,398 A | 8/1994 | Benzoni et al. ............... 385/90 |
| 5,345,524 A | 9/1994 | Lebby et al. ................. 385/88 |
| 5,361,244 A | 11/1994 | Nakamura et al. ........ 369/44.23 |
| 5,388,171 A * | 2/1995 | Michikoshi et al. .......... 385/36 |
| 5,414,787 A | 5/1995 | Kurata ........................ 385/92 |
| 5,416,668 A | 5/1995 | Benzoni ..................... 361/816 |
| 5,416,870 A | 5/1995 | Chun et al. .................. 385/88 |
| 5,416,871 A | 5/1995 | Takahashi et al. ............ 385/88 |
| 5,416,872 A | 5/1995 | Sizer, II et al. ............... 385/92 |
| 5,428,704 A | 6/1995 | Lebby et al. ................. 385/92 |
| 5,432,630 A | 7/1995 | Lebby et al. ............... 359/152 |
| 5,434,747 A | 7/1995 | Shibata ...................... 361/753 |
| 5,446,814 A | 8/1995 | Kuo et al. ................. 385/31 X |
| 5,452,387 A | 9/1995 | Chun et al. .................. 385/88 |
| 5,455,703 A | 10/1995 | Duncan et al. ............. 359/152 |
| 5,473,715 A | 12/1995 | Schofield et al. ............. 385/53 |
| 5,475,783 A | 12/1995 | Kurashima .................. 385/92 |
| 5,482,658 A | 1/1996 | Lebby et al. .............. 264/1.24 |
| 5,499,311 A | 3/1996 | DeCusatis .................... 385/89 |
| 5,499,312 A | 3/1996 | Hahn et al. ................... 385/91 |
| 5,515,468 A | 5/1996 | DeAndrea et al. ............ 385/88 |
| 5,528,408 A | 6/1996 | McGinley et al. .......... 359/152 |
| 5,535,296 A | 7/1996 | Uchida ........................ 385/91 |
| 5,537,391 A | 7/1996 | Lebby .......................... 370/13 |
| 5,546,212 A * | 8/1996 | Kunikane et al. ........... 359/163 |
| 5,546,281 A | 8/1996 | Poplawski et al. .......... 361/752 |
| 5,548,677 A | 8/1996 | Kakii et al. .................. 385/92 |
| 5,550,941 A | 8/1996 | Lebby et al. ................. 385/49 |
| 5,555,334 A * | 9/1996 | Ohnishi et al. ............... 385/93 |
| 5,561,727 A | 10/1996 | Akita et al. ................... 385/88 |
| 5,596,663 A | 1/1997 | Ishibashi et al. .............. 385/92 |
| 5,636,298 A | 6/1997 | Jiang et al. ................... 385/14 |
| 5,687,267 A | 11/1997 | Uchida ........................ 385/89 |
| 5,708,743 A | 1/1998 | DeAndrea et al. ............ 385/88 |
| 5,717,533 A | 2/1998 | Poplawski et al. .......... 361/752 |
| 5,734,558 A | 3/1998 | Poplawski et al. .......... 361/752 |
| 5,736,782 A | 4/1998 | Schairer ..................... 257/679 |
| 5,751,471 A | 5/1998 | Chen et al. ................. 359/319 |
| 5,767,999 A | 6/1998 | Kayner ....................... 359/163 |
| 5,774,614 A | 6/1998 | Gilliland et al. .............. 385/88 |
| 5,778,127 A | 7/1998 | Gilliland et al. .............. 385/92 |
| 5,812,582 A | 9/1998 | Gilliland et al. .............. 372/50 |
| 5,812,717 A | 9/1998 | Gilliland et al. .............. 385/93 |
| 5,815,623 A | 9/1998 | Gilliland et al. .......... 385/92 X |
| 5,864,468 A | 1/1999 | Poplawski et al. ............ 385/88 |
| 5,879,173 A | 3/1999 | Poplawski et al. .......... 438/138 |
| 5,937,114 A | 8/1999 | Fisher et al. .................. 385/14 |
| 6,061,493 A | 5/2000 | Gilliland et al. ............. 385/140 |
| 6,071,017 A | 6/2000 | Gilliland et al. .............. 385/93 |
| RE36,820 E | 8/2000 | McGinley et al. .......... 361/752 |
| 6,142,680 A | 11/2000 | Kikuchi et al. ............... 385/93 |

OTHER PUBLICATIONS

Hunsperger, Integrated Optics: Theory and Technology (2d Ed.), pp. 89–106, 236–245, Springer–Verlag, Berlin, Heidelberg, New York, Tokyo.

Ghatak et al., Introduction to Fiber Optics, (1998), pp. 411–413, 447–449, 467–473, Cambridge University Press, United Kingdom.

Dorf, The Electrical Engineering Handbook, (1993), pp. 1682–1684, CRC Press, Boca Raton, Ann Arbor, London, Tokyo.

Sasaki, Shinichi, et al., "A Compact Optical Active Connector: An Optical Interconnect Module with an Electrical Connector Interface," IEEE Transactions on Advanced Packaging, vol. 22, No. 4, Nov. 1999.

* cited by examiner

LIGHT BENDING OPTICAL BLOCK FOR FIBER OPTIC MODULES

CROSS REFERENCE TO RELATED APPLICATIONS

This non-provisional United States (US) patent application is a continuation-in-part application and claims the benefit of U.S. application Ser. No. 09/321,308, filed by inventors Wenbin Jiang et al on May 27, 1999, entitled "Method and Apparatus for Improved Optical Elements for Vertical PCB Fiber Optic Modules", the disclosure of which is hereby incorporated by reference, verbatim and with the same effect as though it were fully and completely set forth herein; and also claims the benefit of U.S. Provisional Application No. 60/253,606, filed by inventors Wenbin Jiang et al on Nov. 27, 2000, entitled "Light Bending Optical Block for an Optical Transceiver Module"; and also claims the benefit of U.S. Provisional Application No. 60/283,046 filed by inventors Pang et al on Apr. 10, 2001, entitled "Method and Apparatus for Pluggable Fiber Optic Modules", the disclosure of which is hereby incorporated by reference, verbatim and with the same effect as though it were fully and completely set forth herein.

FIELD OF THE INVENTION

This invention relates generally to light coupling devices and fiber optic modules. More particularly, the invention relates to an optical block for coupling optical elements to small form factor fiber connectors.

BACKGROUND OF THE INVENTION

Fiber optic modules interface optical fibers to electronic circuitry transducing light or photons into electrical signals or vice versa. A fiber optic module may be a fiber optic receiver, transmitter or transceiver including both receive and transmit functions. The fiber optic receiver, transmitter and transceiver each including optical elements (OE) and electrical elements (EE), including optoelectronic devices.

The fiber optic transmitter OE includes an emitter (such as a semiconductor LED or Laser) mounted in a package and an optical coupling element for coupling light or photons from the OE into the optical fiber. The type of semiconductor laser (light amplification by stimulated emission of radiation) may be a vertical cavity surface emitting laser (VCSEL).

The fiber optic receiver OE includes a photodetector (such as a photodiode) mounted in a package and an optical coupling element for coupling light or photons from the optical fiber into the photodetector. The EE for each includes integrated circuits and passive elements mounted on a substrate such as a printed circuit board (PCB) or ceramic. The OE and EE coupled together at the emitter and photodetector.

Because of the high transmission frequencies utilized in fiber optic communications, crosstalk between receive and transmit signals is of concern. In order to avoid electronic crosstalk and electro-magnetic interference (EMI), the fiber optic transceiver usually employs separate components and separate shielding of fiber optic receiver and fiber optic transmitter components. In order to avoid optical crosstalk where light or photons can interfere between communication channels, the fiber optic transceiver usually employs separate optical elements for coupling light or photons into and out of the optical fiber for fiber optic receiver and fiber optic transmitter.

The form factor or size of the fiber optic module is of concern. The trend is towards greater usage of fiber optic communication requiring improved connectivity and smaller optical fiber connectors to more densely pack them on a system printed circuit board. Additionally, the desire for tighter interconnect leads of fiber optic cables, restricts the size of the OE's. For example, in the common implementation using a TO header and can, the header dimension of the interconnect lead is normally 5.6 millimeters (mm). In small form factor optical modules, such as the MT family, the two optical fibers are separated by a distance of only 0.75 mm. This severely restricts the method of coupling light or photons from the OE into and out of fiber optic cables.

DETAILED DESCRIPTION OF THE INVENTION

In the following detailed description of the invention, numerous specific details are set forth in order to provide a thorough understanding of the invention. However, it will be obvious to one skilled in the art that the invention may be practiced without these specific details. In other instances well known methods, procedures, components, and circuits have not been described in detail so as not to unnecessarily obscure aspects of the invention.

The invention includes a method, apparatus, and system for a method, apparatus, and system to couple optoelectronic devices to small form factor fiber connectors. In particular, the invention provides an optical block component, or its equivalent, configured to reduce or narrow the distance between two or more transmission paths thereby enabling an optical transceiver module to be coupled to a small form factor fiber optic connector. As employed herein, a transmission path includes a path over which light or photons may be transmitted. The terms transmission path, light path, and photon path may be used interchangeably. Additionally, while the term optical transceiver module is employed herein for illustration, it must be clearly understood, that the invention is equally applicable other optical modules including optical receiver modules and optical transmitter modules.

Figure 1A:
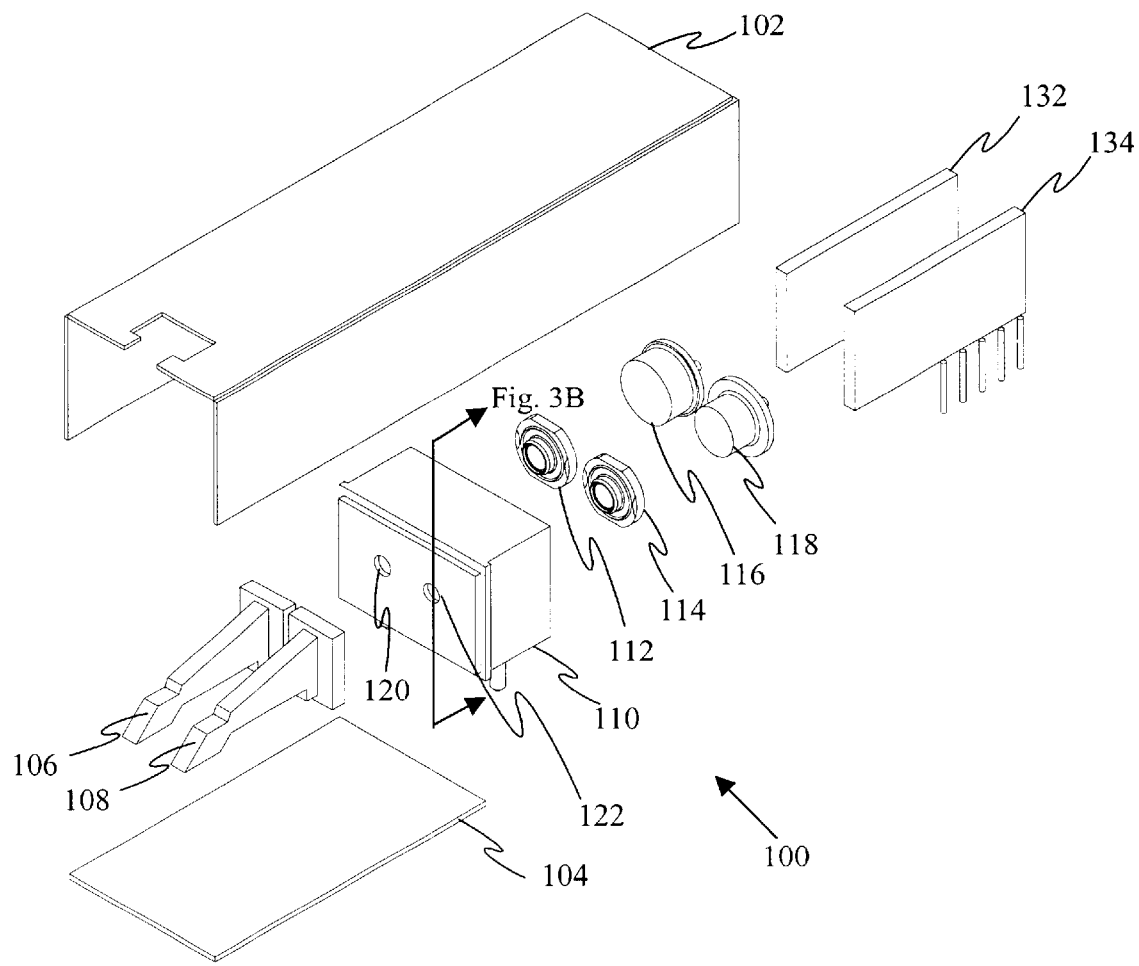
FIG. 1A is a first perspective exploded view of one embodiment of an optical module where the invention may be employed.
Figure 1B:
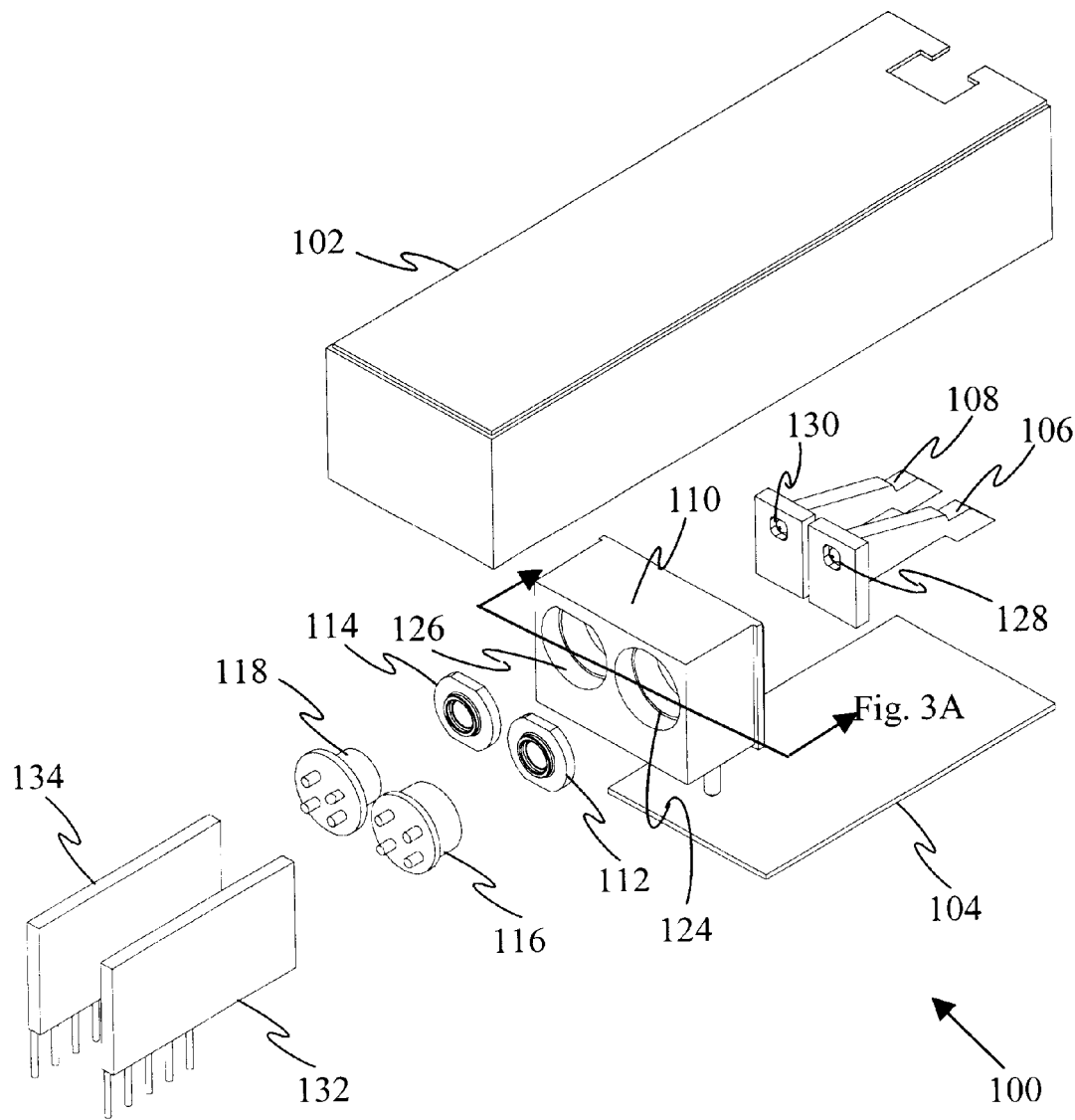
FIG. 1B is a second perspective exploded view of one embodiment of an optical module where the invention may be employed.

FIG. 1A is a first exploded view one embodiment of an optical transceiver module 100 of the invention. FIG. 1B is a second exploded view of the optical transceiver module 100 of the invention. The optical transceiver module 100 includes an upper housing or cover 102 and a lower housing or base 104 to house a plurality of optical and electrical components. A pair of fiber coupling connectors 106 and 108 are employed to receive fiber optic cable and couple it to a fiber optic module. The optical block 110 couples to the fiber coupling connectors 106 and 108 to a pair of lenses 112 and 114 and then to a receiver and transmitter pair 116 and 118 or a pair of receivers or a pair of transmitters. The optical block 110 serves to couple optical signals between optical fibers and optoelectronic devices such as transmitters and receivers. An optoelectronic receiver 116 receives optical signals and converts them to electrical signals. An optoelectronic transmitter 118 converts electrical signals and transmits optical signals. The optoelectronic receiver 116 and transmitter 118 are coupled to circuitry or PCBs 132 and 134 to receive and transmit electrical signals to and from the optical transceiver module. In one implementation, one transmitter TO-can and one receiver TO-can may be used in the optical transceiver module.

Figure 1C:
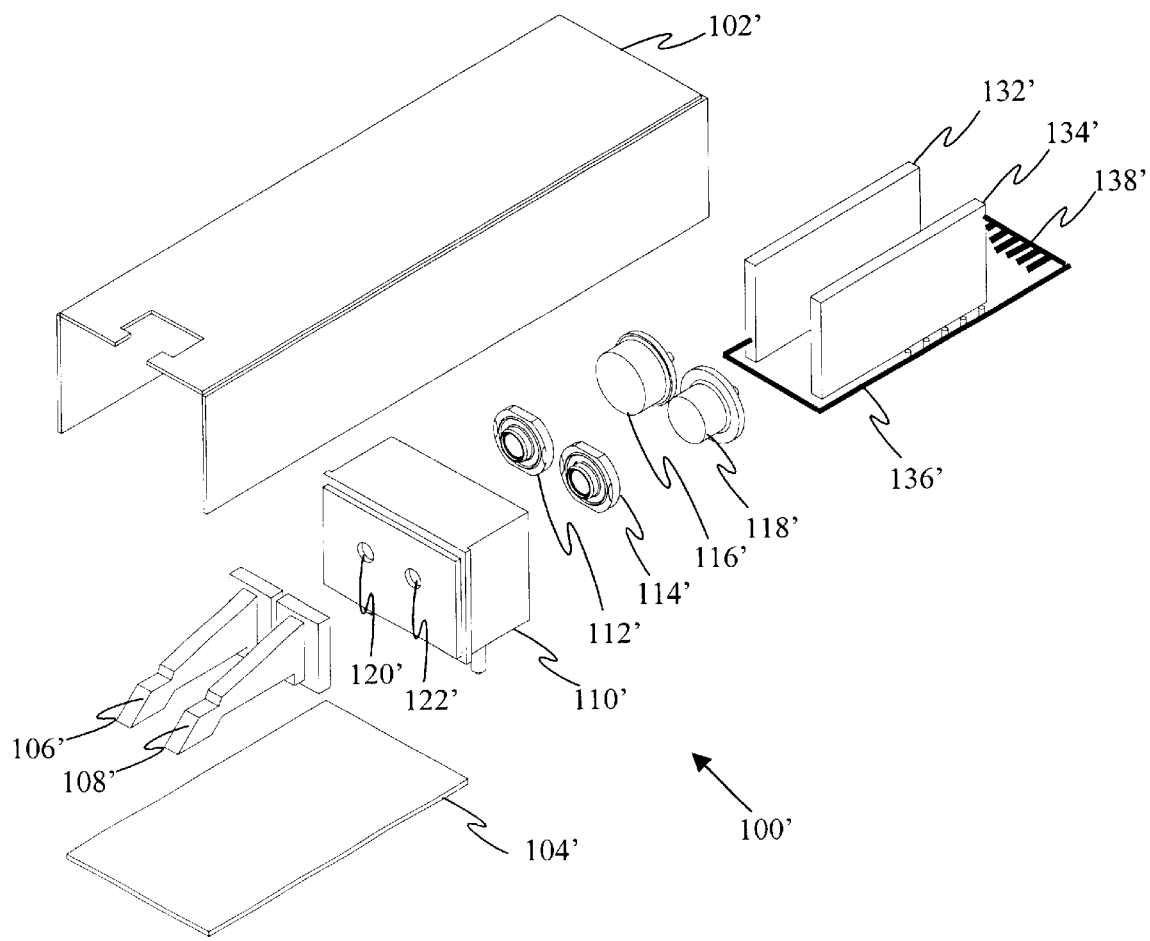
FIG. 1C is a first perspective view of another embodiment of a pluggable optical module where the invention may be employed.
Figure 1D:
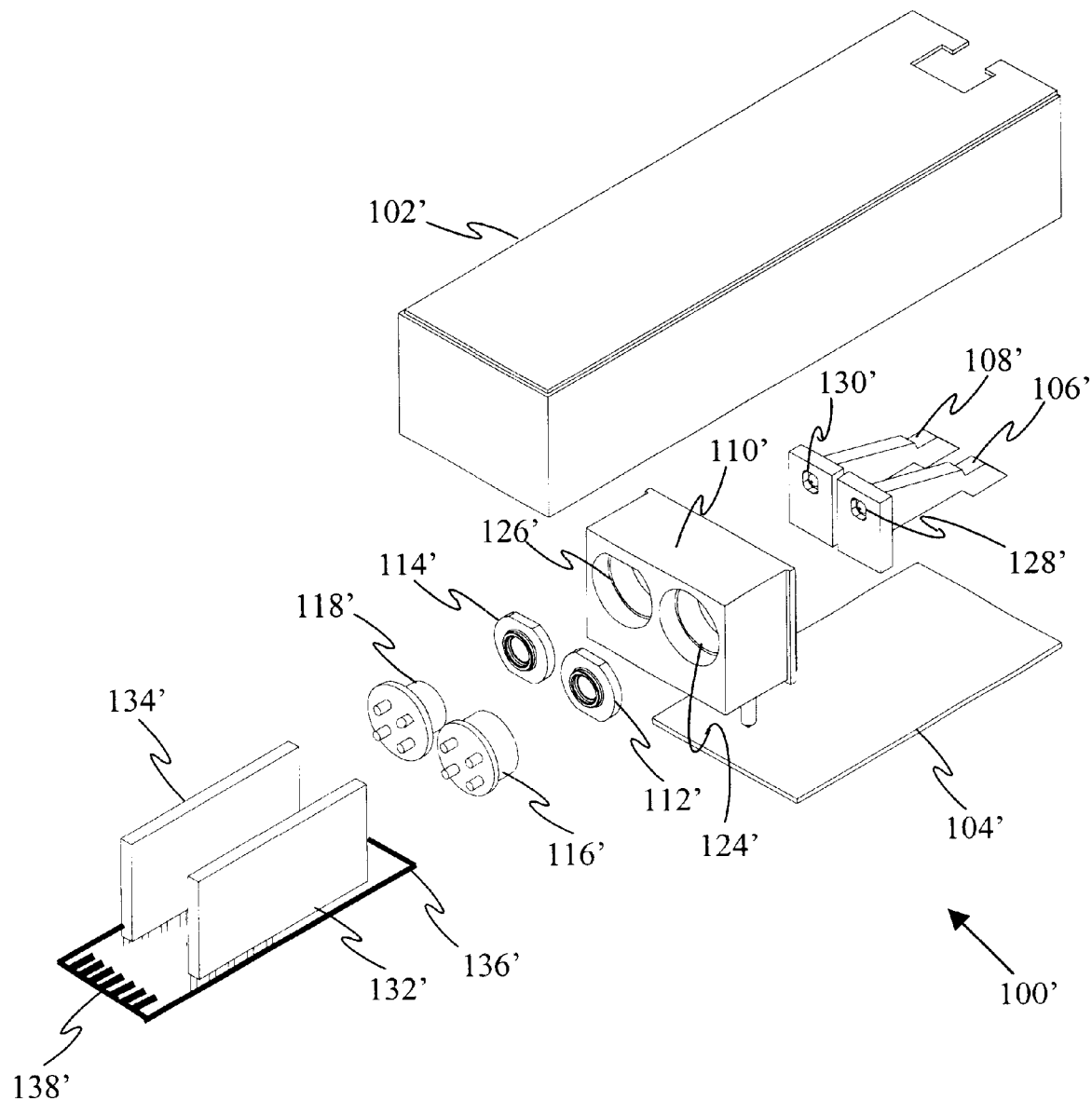
FIG. 1D is a second perspective view of another embodiment of a pluggable optical module where the invention may be employed.

FIGS. 1C and 1D are a first and second perspective views of a pluggable embodiment of an optical transceiver module 100' of the invention. In this embodiment, a coupling board 136' couples to the PCBs 132' and 134' of the optical transceiver module 100' of the invention. The coupling board 136' having a pluggable connecting edge 138' to permit coupling the optical transceiver module 100' to a connector.

Figure 2A:
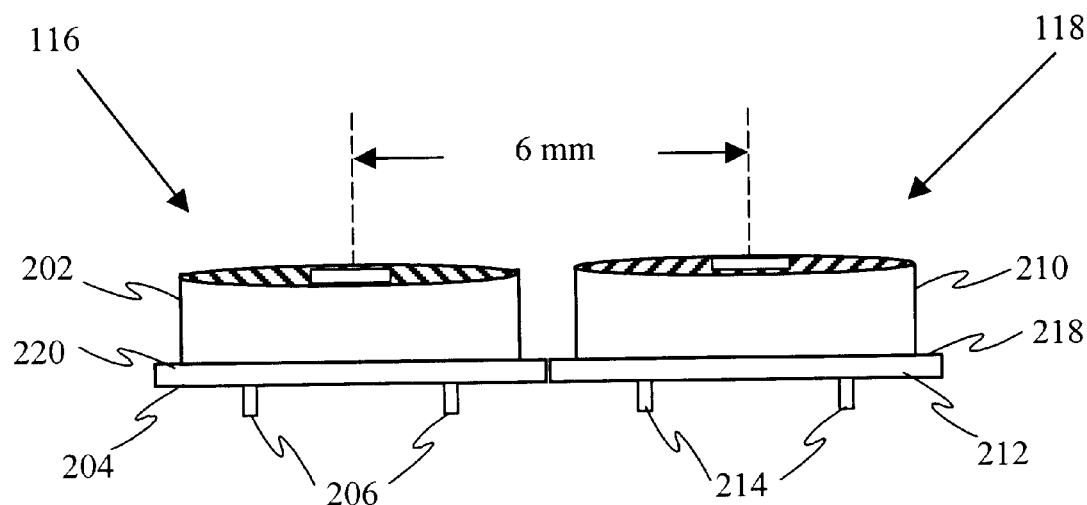
FIG. 2A is a top view of a receiver and a transmitter that may be employed in one embodiment of the invention.
Figure 2B:
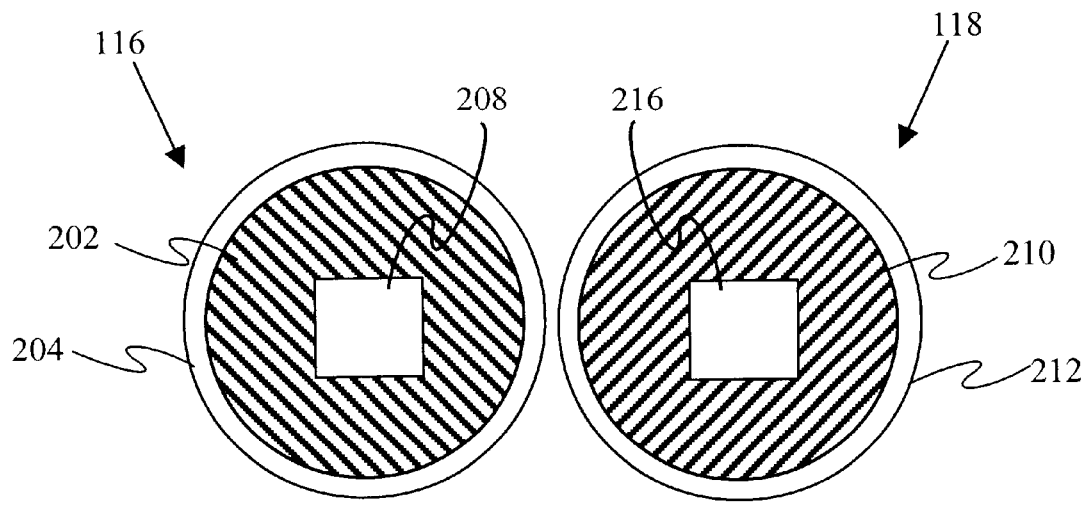
FIG. 2B is a front view of a receiver and a transmitter that may be employed in one embodiment of the invention.

FIGS. 2A and 2B show a TO-packaged receiver 116 and transmitter 118 as may be employed in one embodiment of the invention. While for purposes of illustration TO-packaged devices are employed, the invention is not limited to this type of device package and may be practiced with many other device packages. Each receiver 116 and transmitter 118 consists of a base/header 204 and 212 with an exposed flange 218 and 220 onto which a cap/can 202 and 210 is mounted with optoelectronics or electronic components within. The base/header 204 and 212 provides I/O leads 206 and 214 to interface the optoelectronics and electronic devices within the cap/can 202 and 210 with external PCBs 132 and 134 but may be another PCB interconnecting method or technology such as surface mount. The cap/can 202 and 210 includes a light transmitting window or lens 208 and 216 to form a hermetic package to seal out contaminants. The flange 218 and 220 of a typical TO package measures between 5.3 and 5.6 mm in diameter. As illustrated in FIGS. 1A and 1B, in an optical transceiver module, a TO package housing an optical receiver device is mounted adjacent to an optical transmitter device. The flanges 218 and 220 and base/header 204 and 212 limit the spacing of the devices 116 and 118 and must be overcome to interface with small form factor fiber optic connectors, i.e. 106 and 108.

Due to the size of TO-cans 116 and 118, the center-to-center spacing between the transmitter and receiver is limited by the TO-can header dimension to about 6 mm. In some applications, a fiber optic connector spacing between the transmitter and the receiver is much smaller than 6 mm. For example, the MT-RJ fiber optic connector has as a requirement a fiber spacing of 0.75 mm between the transmitter and the receiver. The VF-45 or SG ("SG" henceforth) fiber optic connector has as a requirement a fiber spacing of 4.5 mm. That is, these small form factor fiber optic connectors, such as fiber optic coupling connectors 106 and 108, have a smaller center-to-center spacing than the center-to-center spacing between the receiver 116 and transmitter 118.

One aspect of the invention provides an optical block to adapt optical devices, i.e. 116 and 118, to any optical fiber interface or connectors, i.e. 106 and 108, requiring smaller spacing between the receiver, i.e. 116, and transmitter, i.e. 118.

Figure 3A:
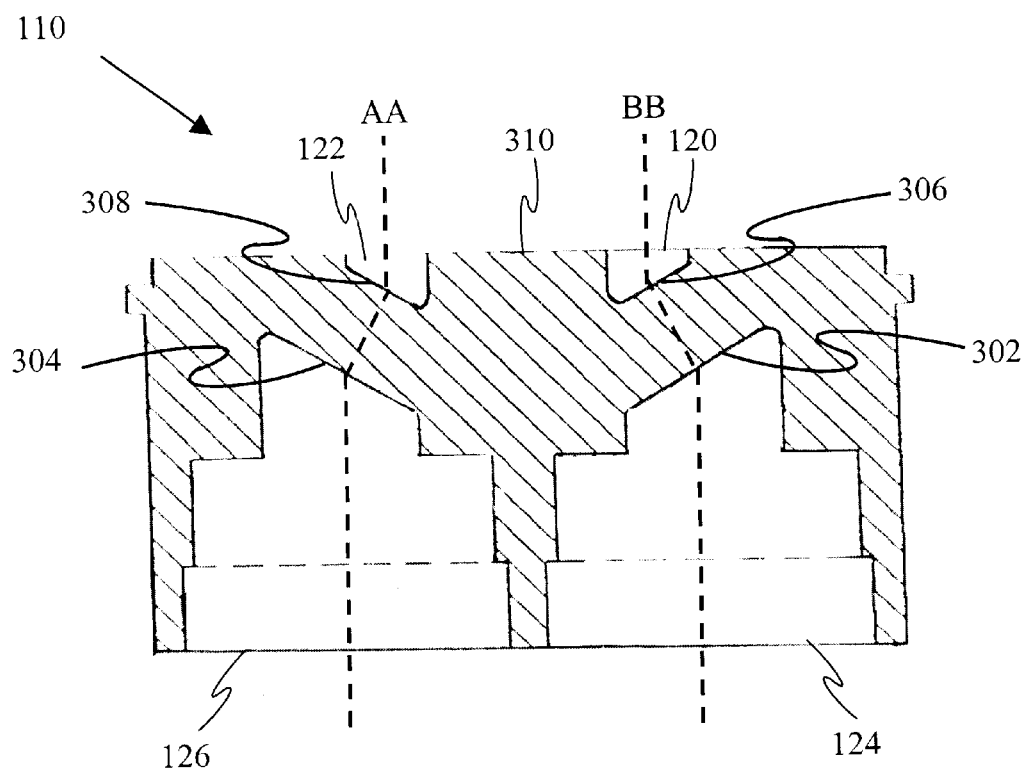
FIG. 3A is a cross-sectional view from the top of the optical block for an embodiment of the invention.

FIG. 3A is a cross-sectional view from the top of the optical block 110 for a first embodiment of the invention. It must be understood that the optical block aspect of the invention is not limited to the optical block 110 illustrated in FIGS. 3A–D but encompasses optical blocks that make use of refraction surfaces to overcome the spacing limitations of optical devices. The optical block 110 may include one or more cavities 124 and 126 to receive optical devices, i.e. 116 and 118. The optical block may also include one or more cavities to receive and couple to fiber coupling connectors, i.e. 106 and 108. The invention involves the use of optical surfaces 302, 304, 306, and 308 to refract and couple photons or light to and from optoelectronic devices and optical fibers. According to one embodiment, the optical surfaces 302, 304, 306, and 308 may be molded into an optical block 110.

As illustrated in FIG. 3A, refraction surfaces 302 and 304, may be part of the two optical device cavities 124 and 126 and may be arranged to refract and couple photons or light to corresponding refraction surfaces 306 and 308, which may be part of cavities 120 and 122 for the fiber coupling photons into or out of optical fibers.

In one embodiment, the refraction surfaces 302, 304, 306, and 308 are arranged to narrow the distance between photon transmission paths. For instance, refraction surfaces 302 and 304 may be angled towards each other, as shown in FIG. 3A, to narrow the centerline or optical axis distance between photon or transmission paths AA and BB. In another embodiment, a first transmission path may refract or bend photons in the direction of a second transmission path while the second transmission path does not refract or bend photons.

According to one embodiment, refraction surfaces 302 and 306 are substantially parallel to each other so that photons enter and leave the optical block 110 at substantially the same angle or substantially parallel paths. Similarly, refraction surfaces 304 and 308 may be substantially parallel to each other to achieve the same result. In various implementations, the angle of refraction of refraction surfaces 302, 304, 306, and 308 may vary to change the distance between refracted transmission paths AA and BB by changing the angle of refraction surfaces 302, 304, 306, and 308 with respect to the incoming transmission paths AA and BB.

In another embodiment, refraction surfaces 304 & 308 and 302 & 306 are not substantially parallel to transmit or receive photons at an angle with respect to the optical axis of the optoelectronic devices.

The optical block 110 may be made from many different photon-transparent or light-transparent materials without changing the character of the invention. In one implementation, the refraction surfaces 302, 304, 306, and 308 are made from the same material as the optical block 110. In another implementation, the refraction surfaces 302, 304, 306, and 308, and material therebetween, are made from a different material than the optical block 110. For example, the refraction surfaces 302, 304, 306, and 308 may be composed from a first material, the areas between the refraction surfaces 302 & 306 and 304 and 308 composed from a second material, and the rest of the optical block composed of a third material. In another implementation, the areas between the refraction surfaces 302 & 306 and 304 and 308 may be hollow. In yet another embodiment, the whole optical block 110, including the refraction surfaces 302, 304, 306, and 308, is molded from a single material such as a themoplastic material.

Figure 3B:
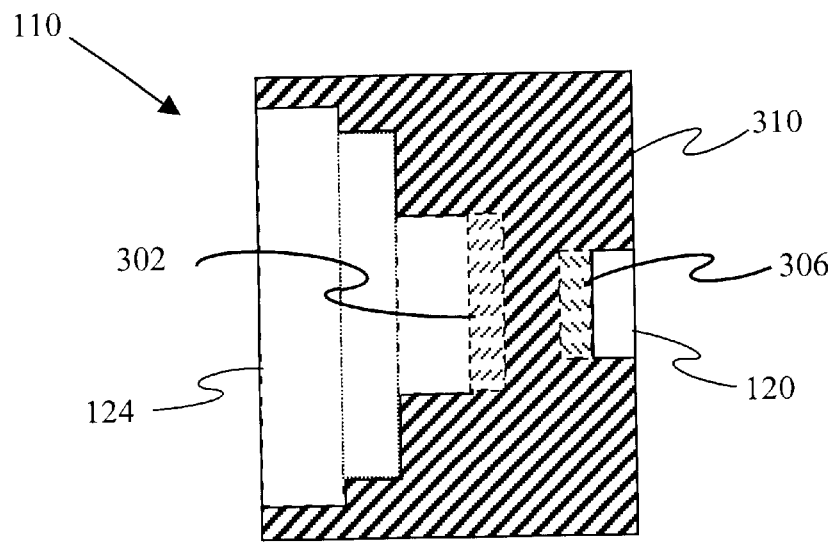
FIG. 3B is a cross-sectional view from the side of the optical block for an embodiment of the invention.

FIG. 3B is a cross-sectional view from the side of the optical block 110 for a first embodiment of the invention. A first cavity 124 in the optical block 110 is illustrated, including a first refracting surface 302. A second cavity 120 at an opposite end of the optical block 110 is illustrated, including a second corresponding refracting surface 306. The refraction surfaces 302 and 306 are arranged to couple photons between a first and a second end of the optical block 110.

Figure 3C:
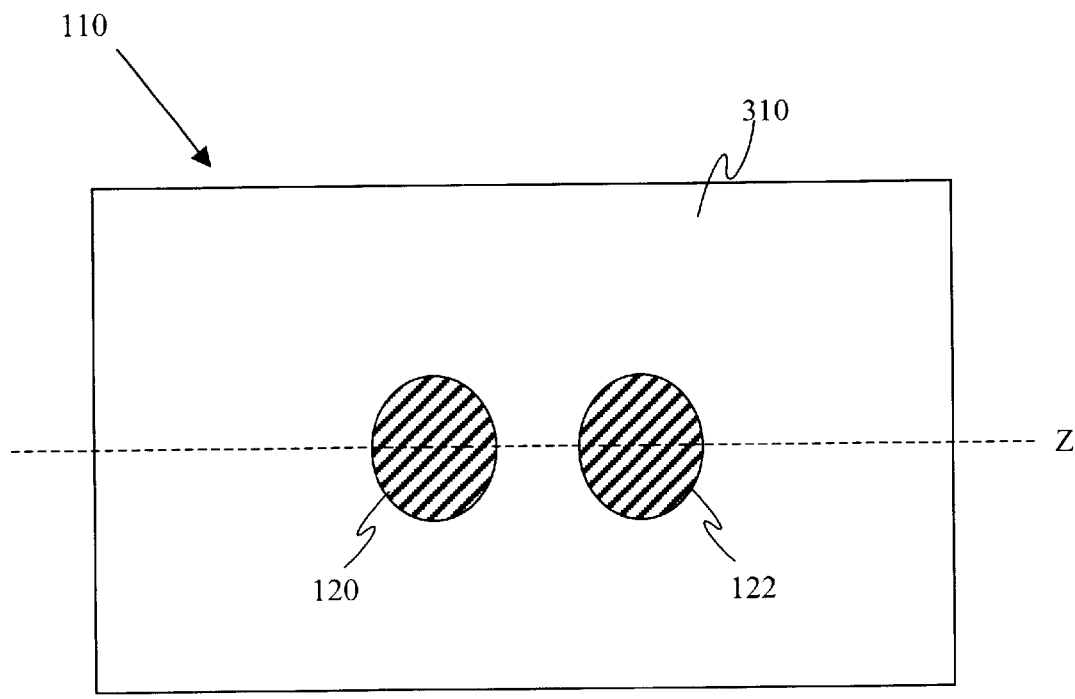
FIG. 3C is a front view of the optical block for an embodiment of the invention.

FIG. 3C is a front view of the optical block 110 for a first embodiment of the invention. The front view illustrates a front face or front-side or first end 310 of the optical block 110. In this embodiment, the photon transmission paths may be coplanar. That is, the photon transmission paths may follow substantially coplanar trajectories from a first to a second end of the optical block 110. As indicated by the cavities 120 and 122, the transmission paths may extend along a first plane Z at a first end of the optical block 110. Similarly, cavities 124 and 126 at a second end of the optical block 110 may extend along plane Z or along a second plane. In one embodiment, the second plane is parallel to plane Z.

Figure 3D:
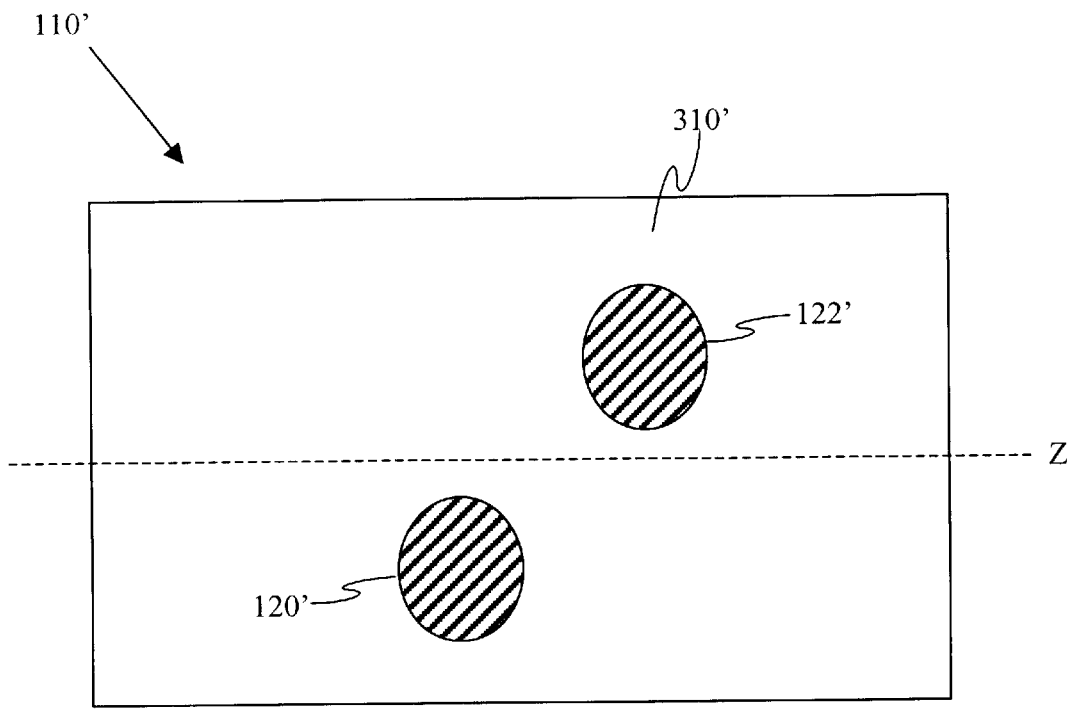
FIG. 3D is a front view of the optical block for another embodiment of the invention.

FIG. 3D is a front view of the optical block 110' for another embodiment of the invention. The front view illustrates a front face or front-side or first end 310' of the optical block 110'. In this embodiment, the photon transmission paths may not be coplanar. That is, the photon transmission paths may follow different planes from a first to a second end of the optical block 110. As indicated by the cavities 120' and 122', the transmission paths may be defined along different planes as desired.

Figure 4A:
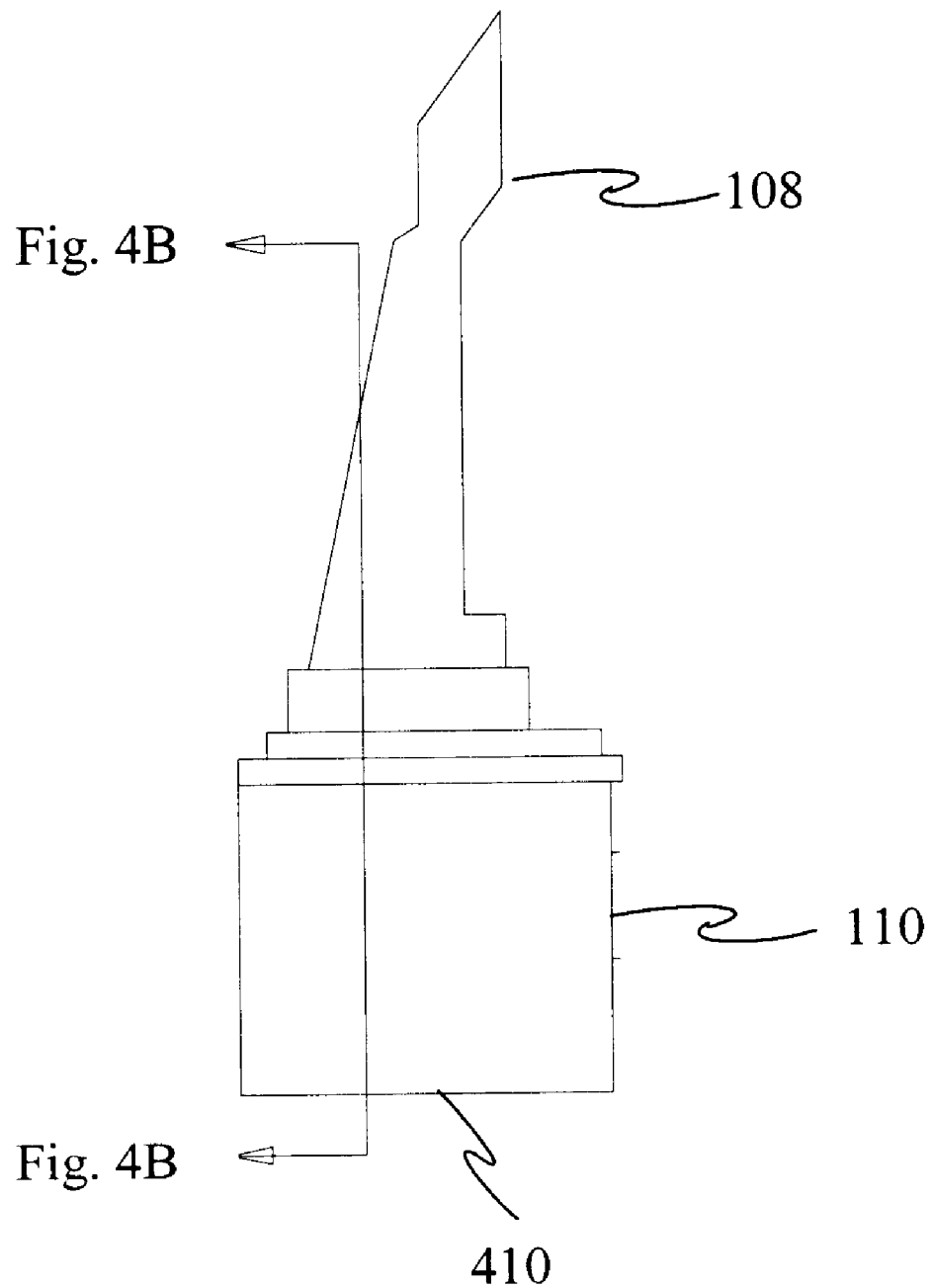
FIG. 4A is a side view of an optical block and fiber optic connector of an embodiment of the invention.

FIG. 4A shows a side view of the optical block 110 and fiber optic connector, i.e. 106, of the invention. The cross sectional detail indicates the cross-sectional view illustrated in FIG. 4B.

Figure 4B:
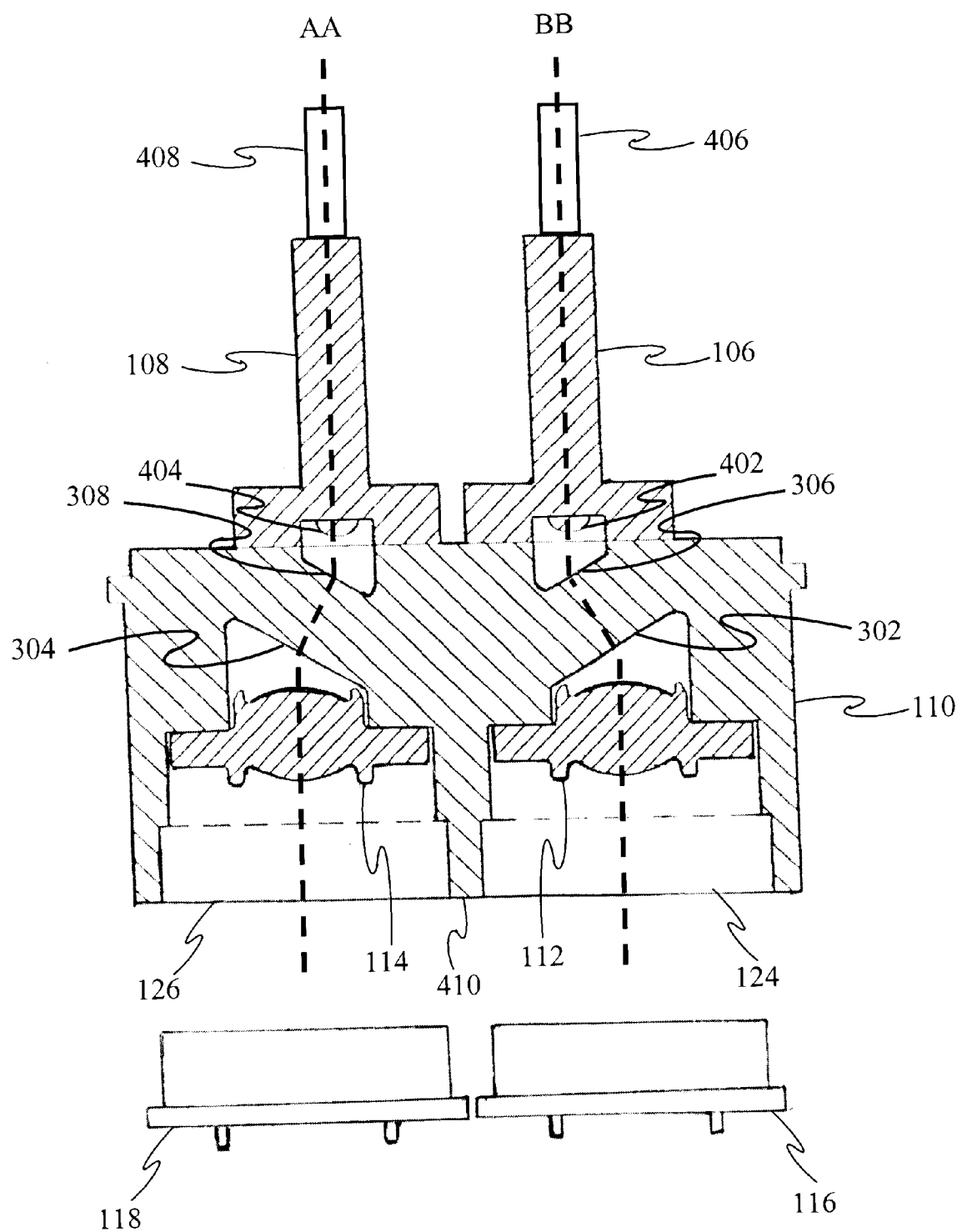
FIG. 4B is a top cross-sectional view of the partially assembled optical transceiver module illustrating the light paths through one embodiment of the optical block of the invention.

FIG. 4B is a cross-sectional view of the partially assembled optical transceiver module 100 illustrating the light paths through one embodiment of the refraction optical block 110. Two TO-packages or optical devices 116 and 118 may be coupled into the openings or cavities 124 and 126 on one side 410 of the optical block 110 to receive and/or transmit photons. The optical block 110 may include lenses 112, 114, 402, and 404 arranged along the photon transmission paths to collimate and/or focus the photons or light. The lenses 112, 114, 402, and 404 may be separate elements or molded together with other elements of the optical block 110. The refraction surfaces 302, 304, 306, and 308 alter the photon or light paths AA and BB so that the light is properly coupled into the smaller spacing optical interfaces or connectors 106 and 108.

According to one embodiment, optical connectors 106 and 108 may each include a lens 402 and 404. Depending on the direction of the photons through each lens 402 and 404, each lens 402 and 404 serves to collimate light or focus light. In another embodiment, each lens 402 and 404 may be a separate element from the optical connectors 106 and 108.

Where the optical device 118 is a transmitter, light or photons emitted by the transmitter 118 are coupled into a first lens 114 which collimates the light and passes it to a first refraction surface 304. Refraction surface 304 refracts or bends the light or photons towards a second refraction surface 308.

Where the first refraction surface 304 is substantially parallel to the second refraction surface 308, the light or photon path leaving the second refraction surface 308 is substantially parallel to the light or photon path that entered the first refraction surface 304 in line or parallel with the optical axis of the optoelectronic device. The light or photons then travel to a second lens 404 which focuses the light or photons into an aligned optical fiber 408 through the fiber coupling connector 106.

Where the optical device 116 is a receiver, light or photon path, incident from an optical fiber 406, is received through the fiber coupling connector 106. Light or photons from the optical fiber are aligned to be incident upon lens 402. Lens 402 collimates the incident light or photons from an optical fiber 406 onto a third refraction surface 306. The third refraction surface 306 reflects incident light towards a fourth refraction surface 302. Where the third refraction surface 306 is substantially parallel to the fourth refraction surface 302, the light or photon path leaving the fourth refraction surface 302 is substantially parallel to the light or photon path that entered the third refraction surface 306 in line or parallel with the optical axis of the optoelectronic device. The fourth refraction surface 302 reflects or bends the light or photons towards lens 112. Lens 112 focuses the light or photons received into the receiver 116.

The previous description discloses fiber optic modules as including a receiver and a transmitter. However, one of ordinary skill in the art can appreciate that the fiber optic module may include one or more receivers only, one or more transmitters only, or a combination of one or more transmitters and/or receivers. Additionally, the previous description described an optical block with two transmission paths. However, other embodiments of the optical block of the invention may provide a plurality of transmission paths for coupling photons between transmitter devices and/or receiver devices to fiber optic cables. Thus, the optical block 110 may accommodate multiple photon transmission paths in various configurations including side-by-side transmission paths and/or stacked transmission paths.

As those of ordinary skill will recognize, the invention has many advantages over the prior art. One advantage of the invention is that it permits the use of conventional TO-can optical devices with small form factor fiber optic connectors. Another advantage of the invention is that optical block provides an effective way of coupling larger transmitter and receiver devices to narrower optical fiber connectors. Another advantage of the invention is that, in one implementation, the refraction surfaces may be molded as part of the optical block to minimize the number of components necessary and achieve a cost effective solution.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A fiber optic module comprising:

a first optoelectronic device;

a second optoelectronic device; and an optical block coupled to the first and second optoelectronic devices at one side, the optical block to couple photons along a first photon path between the first optoelectronic device at the one side and a first optical fiber at another side, couple photons along a second photon path between the second optoelectronic device at the one side and a second optical fiber at the another side, and narrow the distance between the first photon path and the second photon path from the one side of the optical block substantially near where the the first and second optoelectronic devices are coupled to the another side of the optical block substantially near where photons are to be coupled between the first and second optical fibers and the optical block.

2. The fiber optic module of claim 1 wherein, the first optoelectronic device is a receiver element; and the second optoelectronic device is a transmitter element.

3. The fiber optic module of claim 1 wherein, the first and the second optoelectronic devices are transmitter elements.

4. The fiber optic module of claim 1 wherein, the first and the second optoelectronic devices are receiver elements.

5. The fiber optic module of claim 1 further comprising:

a plurality of optoelectronic devices, the optical block to further couple photons between the plurality of optoelectronic devices and a plurality of optical fibers.

6. The fiber optic module of claim 1 further comprising:

one or more lenses, the lenses positioned between the first optoelectronic device and the optical block.

7. The fiber optic module of claim 1 further comprising:

one or more lenses, the lenses positioned between the first optical fiber and the optical block.

8. The fiber optic module of claim 1 further comprising:

a first lens; and a second lens, the lenses positioned between the first optical fiber and the first optoelectronic device.

9. The fiber optic module of claim 1 wherein the optical block includes a first refraction surface to alter the path of photons between the first optoelectronic device and the first optical fiber and couple photons between the first optoelectronic device and the first optical fiber.

10. The fiber optic module of claim 9 wherein the first refraction surface of the optical block is at a non-perpendicular angle to the path of the photons.

11. The fiber optic module of claim 9 wherein the optical block further includes a second refraction surface substantially parallel to the first refraction surface to couple photons between the first optoelectronic device and the first optical fiber.

12. The fiber optic module of claim 1 wherein the optical block includes a first cavity to couple the first optoelectronic device therein.

13. The fiber optic module of claim 12 wherein the first cavity includes a refractive surface at a non-perpendicular angle to the path of the photons to alter the path of photons and direct them between the first optoelectronic device and the first optical fiber.

14. The fiber optic module of claim 1 further comprising:

a first optical fiber coupling connector to couple to the first optical fiber and the optical block.

15. The fiber optic module of claim 14 wherein the first optical fiber coupling connector includes a lens to couple photons between the first optical fiber and the optical block.

16. The fiber optic module of claim 14 wherein the optical block includes a first cavity to couple photons between the first optical fiber coupling connector and the first optoelectronic device, the cavity defining a refractive surface at a non-perpendicular angle to the path of the photons, the refractive surface to alter the path of photons between the first optoelectronic device and the first optical fiber.

17. The fiber optic module of claim 1 wherein the distance between the first and the second photon paths decreases from the one side of the optical block that couples to the first and the second optoelectronic devices to the another side of the optical block.

18. The fiber optic module of claim 17 wherein the distance between the first and the second photon paths on the another side of the optical block to couple to the first and the second optical fibers is approximately 4.5 millimeters.

19. The fiber optic module of claim 17 wherein the distance between the first and the second photon paths on the another side of the optical block to couple to the first and the second optical fibers is approximately 0.75 millimeters.

20. The fiber optic module of claim 1 wherein the optical block to alter the second path of photons and direct them between the second optoelectronic device and the second optical fiber.

21. A fiber optic module comprising:

a first optoelectronic device;

a second optoelectronic device; and an optical block for coupling photons between optical fibers and the first optoelectronic device and the second optoelectronic device, the optical block having a first cavity on a first side for receiving the first optoelectronic device, a second cavity on a second side for coupling to a first optical fiber connector, and to couple photons between a first optical fiber and the first optoelectronic device, a third cavity on the first side for receiving the second optoelectronic device, a fourth cavity on the second side for coupling to a second optical fiber connector, and to couple photons between the second optoelectronic device and a second optical fiber, and the distance between a centerline of the first cavity and a centerline of the third cavity being different than a distance between a centerline of the second cavity and a centerline of the fourth cavity.

22. The fiber optic module of claim 21 wherein the first optoelectronic device is a receiver, and the second optoelectronic device is a transmitter.

23. The fiber optic module of claim 22 wherein the transmitter is an emitter, and the receiver is a photodetector.

24. The fiber optic module of claim 21 wherein the first optoelectronic device and second optoelectronic device are both receivers.

25. The fiber optic module of claim 21 wherein
the first optoelectronic device and second optoelectronic device are both transmitters.

26. The fiber optic module of claim 21 wherein
the first cavity has a refraction surface to alter the path of the photons and direct them between the first optical fiber and the first optoelectronic device.

27. The fiber optic module of claim 26 wherein
the refraction surface is at a non-perpendicular angle to the direction of the photons.

28. The fiber optic module of claim 26 further comprising:
a focusing lens coupled between the first optoelectronic device and the optical block to receive photons from the refraction surface and direct them towards the first optoelectronic device.

29. The fiber optic module of claim 26 wherein
the second cavity has a refraction surface to alter the path of the photons and direct them between the first optical fiber and the first optoelectronic device.

30. The fiber optic module of claim 29 wherein
the refraction surface of the second cavity is substantially parallel to the refraction surface of the first cavity.

31. The fiber optic module of claim 29 further comprising:
a collimating lens coupled between the optical block and the first optical fiber to receive photons from the first optical fiber and direct them towards the refraction surface of the second cavity.

32. The fiber optic module of claim 21 wherein
the third cavity has a refraction surface to alter the path of the photons and direct them between the second optoelectronic device transmitter and the second optical fiber.

33. The fiber optic module of claim 32 wherein
the refraction surface is at a non-perpendicular angle to the path of the photons.

34. The fiber optic module of claim 33 further comprising:
a collimating lens coupled between the second optoelectronic device and the optical block to receive photons from the second optoelectronic device and direct them towards the refraction surface.

35. The fiber optic module of claim 34 wherein
the refraction surface is at a non-perpendicular angle to the direction of the photons passing through the collimating lens.

36. The fiber optic module of claim 33 wherein
the fourth cavity has a refraction surface to alter the path of the photons and direct them between the second optoelectronic device and the second optical fiber.

37. The fiber optic module of claim 36 wherein
the refraction surface of the fourth cavity is substantially parallel to the refraction surface of the third cavity.

38. The fiber optic module of claim 36 further comprising:
a focusing lens coupled between the optical block and the second optical fiber to receive photons from the refraction surface of the fourth cavity and direct them towards the second optical fiber.

39. A fiber optic module comprising:
a first means for transducing, the first means for transducing to transduce first electrical signals into first photons;
a second means for transducing, the second means for transducing to transduce second photons into second electrical signals; and
means for coupling and narrowing, the means for coupling and narrowing to couple photons between the first means for transducing and a first optical fiber plugged into a duplex fiber optic connector along a first light path and to couple photons between the second means for transducing and a second optical fiber plugged into the duplex fiber optic connector along a second light path, the means for coupling and narrowing further to narrow a distance between the first light path and the second light path from the first and second means for transducing to the duplex fiber optic connector into which the first and second optical fibers can plug.

40. The fiber optic module of claim 39 wherein
the means for coupling and narrowing includes
a plurality of refracting means to narrow the distance between the first and second light paths from a first side to a second side of the means for coupling and narrowing.

41. The fiber optic module of claim 39 further comprising:
a means for collimating photons in the first light path.

42. The fiber optic module of claim 39 further comprising:
a means for focusing photons towards the second means for transducing.

43. An optical block for coupling photons between a first side and a second side, the optical block comprising:
a first pair of refraction surfaces at the first side of the block to refract photons between the first and second sides of the optical block over a first photon path and a second photon path, the second photon path separate from the first photon path;
a second pair of refraction surfaces at the second side of the optical block to refract photons into or out of the optical block over the first photon path and the second photon path; and
wherein centerlines of the second side of the optical block are separated by a second distance less than a first distance of separation between centerlines of the first pair of refraction surfaces at the first side of the optical block.

44. The optical block of claim 43 for coupling photons between a first side and a second side, wherein
each refraction refraction surface of the first pair of refraction surfaces is substantially parallel to a respective refraction surface of the second pair of refraction surfaces.

45. The optical block of claim 43 for coupling photons between a first side and a second side wherein
photons leave the second pair of refraction surfaces at an angle similar to an angle the photons arrived at the first pair of refraction surfaces.

46. An optical block for coupling photons between a first side and a second side, the optical block comprising:
a first refraction surface at the first side of the block to refract photons towards the second side of the block on a first photon path;
a second refraction surface at the second side of the block to receive photons on the first photon path and refract them;
a third refraction surface at the second side of the block to refract photons towards the first side of the block on a second photon path; and
a fourth refraction surface at the first side on the block to receive the photons on the second photon path and refract them.

47. The optical block of claim 46 for coupling photons between a first side and a second side, wherein
a distance between the first photon path and the second photon path changes between the first side and the second side of the block.

48. The optical block of claim 47 for coupling photons between a first side and a second side, wherein the distance between the first photon path and the second photon path decreases between the first side and the second side of the block.

49. An optical block for coupling photons between a first side and a second side, the optical block comprising:

a first refraction surface at the first side of the block to refract photons towards the second side of the block on a first photon path;

a second refraction surface at the second side of the block to receive the photons on the first photon path and refract them;

a third refraction surface at the first side on the block to refract photons towards the second side of the block on a second photon path; and a fourth refraction surface at the second side on the block to receive the photons on the second photon path and refract them; and wherein the distance between the first photon path and the second photon path changes between the first side and the second side of the block.

50. A method for coupling photons between spaced-apart optoelectronic devices and respective spaced-apart optical fibers, comprising:

coupling light between a first optoelectronic device and a first optical fiber defining a first light path;

refracting light between a second optoelectronic device and a second optical fiber towards the first light path without intersecting the first light path; and coupling light between the second optoelectronic device and the second optical cable as a second light path.

51. The method of claim 50 further comprising:

refracting light between the first optoelectronic device and the first optical fiber towards the second light path without intersecting the second light path.

52. A method for manufacturing an optical block, the method comprising:

providing a block of material;

forming a first cavity in a first face of the block, the first cavity including a first refraction surface; and forming a second cavity in a second face of the block, the second cavity including a second refraction surface, the second cavity and the first cavity providing a first photon path through the first refraction surface and the second refraction surface.

53. The method of claim 52 for manufacturing an optical block, further comprising:

forming a third cavity in the first face of the block; and forming a fourth cavity in a second face of the block, the fourth cavity and third cavity providing a second photon path, the centerline distance between the first photon path and the second photon path being greater at the first face of the block than a centerline distance between the first photon path and the second photon path at the second face of the block.

54. The method of claim 53 for manufacturing an optical block, further comprising:

forming a third refraction surface in the third cavity; and forming a fourth refraction surface in the fourth cavity, the third cavity and fourth cavity providing the second photon path through the third refraction surface and the fourth refraction surface, the first refraction surface and the third refraction surface configured to refract light towards the second refraction surface and the fourth refraction surface respectively, narrowing the distance between the first photon path and the second photon path.

55. The fiber optic module of claim 1 wherein the distance between the first photon path and the second photon path at the another side of the optical block is less than the distance between the first photon path and the second photon path at the one side of the optical block.

56. The fiber optic module of claim 55 wherein the distance between the first photon path and the second photon path at the one side of the optical block is six millimeters.

57. The fiber optic module of claim 56 wherein the distance between the first photon path and the second photon path at the another side of the optical block is three-fourths of a millimeter.

58. The fiber optic module of claim 39 wherein the distance between the first light path and the second light path at the duplex fiber optic connector is less than the distance between the first light path and the second light path at the first and second means for transducing.

59. The fiber optic module of claim 58 wherein the distance between the first light path and the second light path at the first and second means for transducing is six millimeters.

60. The fiber optic module of claim 59 wherein the distance between the first photon path and the second photon path at the duplex fiber optic connector is three-fourths of a millimeter.

61. The optical block of claim 46 for coupling photons between a first side and a second side, wherein the first refraction surface is substantially parallel to the second refraction surface.

62. The optical block of claim 46 for coupling photons between a first side and a second side, wherein photons leave the second refraction surface at an angle similar to an angle the photons arrived at the first refraction surface.

63. The optical block of claim 48 for coupling photons between a first side and a second side, wherein the distance between the first photon path and the second photon path decreases over a range from six millimeters up to and including three-fourths of a millimeter between the first side and the second side of the block.

64. The optical block of claim 49 for coupling photons between a first side and a second side, wherein the distance between the first photon path and the second photon path decreases between the first side and the second side of the block.

65. The optical block of claim 64 for coupling photons between a first side and a second side, wherein the distance between the first photon path and the second photon path decreases over a range from six millimeters up to and including three-fourths of a millimeter between the first side and the second side of the block.

66. The method of claim 50 wherein the spaced-apart optical fibers are more narrowly spaced-apart than the spaced-apart optoelectronic devices.

67. The method of claim 50 wherein the first optical fiber is spaced-apart from the second optical fiber by less than six millimeters.

68. The method of claim 67 wherein the spaced-apart optoelectronic devices are spaced-apart by at least six millimeters.

69. The method of claim 50 wherein the first optical fiber is spaced-apart from the second optical fiber by four and one-half millimeters.

70. The method of claim 69 wherein the spaced-apart optoelectronic devices are spaced-apart by at least six millimeters.

71. The method of claim 50 wherein the first optical fiber is spaced-apart from the second optical fiber by three-fourths of a millimeter.

72. The method of claim 71 wherein the spaced-apart optoelectronic devices are spaced-apart by at least six millimeters.

* * * * *